Figure 1:
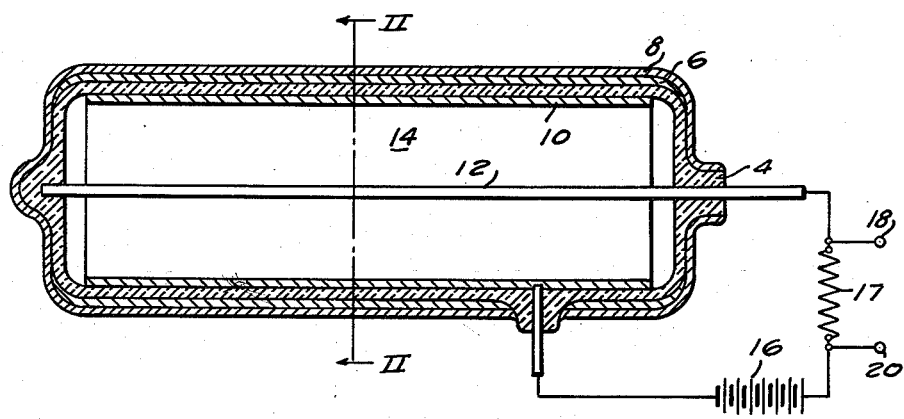

Dec. 19, 1950  FITZ-HUGH B. MARSHALL  2,534,922
BROAD BEAM RADIATION DETECTOR, USING ULTRAVIOLET
AS AN INTERMEDIATE STEP
Filed June 11, 1948

WITNESSES:

INVENTOR
Fitz-Hugh B. Marshall.
BY
ATTORNEY

Patented Dec. 19, 1950

2,534,922

UNITED STATES PATENT OFFICE 2,534,922

BROAD BEAM RADIATION DETECTOR, USING ULTRAVIOLET AS AN INTERMEDIATE STEP

Fitz-Hugh B. Marshall, Glenshaw, Pa., assignor to Westinghouse Electric Corporation, East Pittsburgh, Pa., a corporation of Pennsylvania Application June 11, 1948, Serial No. 32,348

12 Claims. (Cl. 250—83.6)

My invention relates to the detection of elementary particles or quanta of radiation, and it has particular relation to the detection of elementary particles of the neutron type.

By "elementary particles," I mean molecular atomic, or nuclear particles including electrons.

By "quanta of radiation," I mean high-frequency electromagnetic radiations, such as gamma rays, X-rays, and ultra-violet rays, which cause fluorescence when they impinge on a suitable material.

By "elementary particles of the neutron type," I mean atomic or nuclear particles, such as neutrons, which do not produce scintillations when they impinge on a fluorescent body such as a screen of zinc sulphide, zinc cadmium sulphide, or calcium tungstate.

My invention is an improvement over the invention of Kuan-Han Sun, disclosed in his application Serial No. 755,636, filed June 19, 1947, and assigned to Westinghouse Electric Corporation. The Sun application discloses a system for detecting scintillations produced by elementary particles. This system employs a photoelectric layer on the inner surface of a quartz tube which layer produces photo-electrons when bombarded by certain radiations. On certain occasions, I have found the life of an important part of the Sun tube to be excessively shortened.

It is, accordingly, an object of my invention to provide apparatus which shall not be excessively deteriorated after a short time of use, for counting elementary particles.

Another object of my invention is to provide apparatus and method for detecting quanta of radiation.

A further object of my invention is to provide apparatus and a method for counting scintillations produced by elementary particles of the neutron type incident at a high velocity.

A still further object of my invention is to provide apparatus and method for detecting elementary particles of the neutron type incident at a low velocity.

An ancillary object of my invention is to provide apparatus having a long operating life and a method incident to the apparatus for detecting and counting elementary particles.

A further ancillary object of my invention is to provide a method and apparatus for the detection and counting of elementary particles which apparatus is simple to manufacture.

My invention arises from the realization that the life of prior art apparatus employing solid phosphors is reduced by reason of the disintegration by positive ions of the photoelectric layer on the inner surface of the tube. Such ions are projected on to the layer by the field between the anode and cathode.

In the practice of my invention, the photoelectric layer has been removed from the inner surface of the tube. Instead, the radiation from the coating on the outer surface of the tube is employed directly to ionize the gas in the tube.

Figure 2:
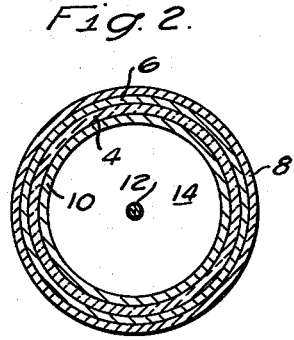

The novel features that I consider characteristic of my invention are set forth with particularity in the appended claims. The invention itself, however, both as to its organization and its method of operation, together with additional objects and advantages thereof, will best be read in connection with the accompanying drawing, in which:

Figure 1 is a view, partly in section and partly diagrammatic, of an embodiment of my invention; and Fig. 2 is a sectional view of an embodiment of my invention, taken along line II—II of Fig. 1.

The apparatus shown in the drawing comprises an envelope 4 of quartz or other ultra-violet transmitting material, such as glass manufactured by Corning Glass Company under the trade-mark Corex. On the outer surface of this envelope, there is a coating 6 composed of at least two substances. One of these substances is sensitive to neutrons and on bombardment by neutrons gives off charged particles. The other substance, when bombarded by these charged particles, gives off radiation such as ultra-violet light. This outer coating may be composed of any of a number of mixtures or compounds, such as a boron-impregnated phosphor. The phosphor selected should have a high yield of ultra-violet fluorescent emission when bombarded by charged particles. For examples of phosphors that might be selected, see chapters X and XI of "Fluorochemistry," by J. De Ment, Chemical Publishing Company, Brooklyn, New York, 1945. The use of a fluorescent material comprising thick layers of a transparent organic material, such as naphtha, should be very effective. The thickness may be so great as to provide much more complete radiation absorption than is possible with the usual fluorescent screens. Because the single large crystals are quite transparent, the light produced is still effective.

Around the coating 6, a material 8, which is transparent to neutrons but which is not transparent to undesirable radiation, such as ultra-violet light, is preferably provided. The coating 8 is preferred but not essential in the practice of my invention.

On the inner surface of the envelope 4, there is a transparent conducting coating 10 which constitutes the cathode. An example of such a coating is the material manufactured by The Pittsburgh Plate Glass Company called Nesa. This cathode may also consist of other constructions such as an open-work of metal, such as a grid, or a thin layer of metal, such as aluminum, sputtered on the surface of the envelope. Near the center of the envelope is an anode 12 comprising some conducting substance such as copper. Between the anode and the cathode in the interior of the envelope is a gas 14 which is readily ionized by the ultra-violet light produced by the fluorescent coating on the outer surface of the envelope.

The geometry of the anode 12 with respect to the cathode 10 and the gas 14 is selected according to the conventional requirements of a Geiger counter, proportional counter, or ionization chamber according to the type of action preferred. Such details are well-known in the art.

Connected between the anode 12 and cathode 10 is an external source of potential 16 and resistance 17. The potential difference developed across the resistance 17 as a result of ionization currents in the pulse, is applied through the connections 18 and 20 to an appropriate measuring device.

In using the term "ultra-violet," I do not intend to limit myself strictly to any of the numerous radiation frequency bands which are characterized as ultra-violet on charts and in textbooks. By the term "ultra-violet," I mean the radiant energy band extending from well into the visible (on the low-frequency side) to well into X-rays (on the high-frequency side). We mean to include similar radiation to which Geiger counters are sensitive, even if this radiation extends into the visible spectrum and is, therefore, not technically ultra-violet radiation.

Neutrons impinging on the neutron-sensitive layer 6 composed, for example, of boron-impregnated phosphor will be captured by the boron and charged particles will be emitted from the boron. When these charged particles bombard the phosphor, ultra-violet light is radiated. The ultra-violet light passes through the wall of the quartz tube 4 through the transparent conducting coating 10 and into the gas on the interior of the tube. When the photons of ultra-violet light strike the molecules of the gas, the gas is ionized.

The negative particles produced by the ionization are attracted toward the anode or in the center of the tube. As the negative particles move toward the anode under the force of the electrostatic field in the tube, they gain energy. When these particles strike other molecules, they cause further ionization if the potential difference is sufficiently high. This process of ionization continues until the particles reach the anode near the center of the tube. This process of successive ionization produces amplification which varies with the nature of the gas, the field between the anode and cathode, and the distance from the anode at which the particles are first formed by the photons.

Ordinarily, the device is to be operated as a Geiger counter, with the electrode geometry and high operating potential to such a conventional counter tube. An appropriate gas may be added if necessary for self-quenching action, to allow greater counting speeds. The advantage in operating as a Geiger counter, as always, is that the impulses are large and easily counted. However, the tube may be operated at a lower potential as a proportional counter; despite smaller impulses, discrimination on the basis of pulse size is thus made possible, the pulse amplitude being roughly proportional to the amount of light emitted by the phosphor per scintillation; in turn, this quantity of light per scintillation may in favorable instances be proportional to the energy in the original incident particle or quanta of radiation. Thus mixed radiation may be "separated." The device might also be operated as an ionization chamber, with no gaseous amplification. However, the usual advantages of the ionization chamber are not realized merely by virtue of this, since the original radiation is not absorbed in the gas. Ionization chamber action might be used for purposes of stable operation at high radiation intensities.

Thus far, I have explained the operation of this invention while assuming that the neutrons impinging on the boron-impregnating phosphor coating are moving with sufficiently low velocities to be captured by the boron or other neutron sensitive material present. However, if operation of this invention is desired with neutrons of very high velocity, a material surrounding the tubes can be used to slow the neutrons down to that velocity which will produce the best results. This surrounding layer can also be constructed so as to prevent the entry of ultra-violet or other undesirable radiation into the tube and prevent the ultra-violet radiation formed in the phosphor from escaping outside the tube while allowing neutrons to pass through freely. The latter effect could be achieved by placing a cardboard box coated white inside, surrounding the tube. The white coating would prevent the passage of the ultra-violet light without preventing the passage of the neutrons. For slowing the neutrons to a speed optimum for a reaction with the boron, a layer of carbon could be used, preferably outside the surrounding layer.

Thus far, I have described my invention with reference to elementary particles of the neutron type. However, in accordance with the broader aspects of my invention and in the absence of the aforementioned surrounding layer or by properly choosing this material so that charged particles are not stopped by it, the apparatus comprising my invention can also be used to detect and count elementary particles of the proton type. By elementary particles of the proton type, I mean particles which produce visible scintillations when they impinge on a fluorescent body. In this embodiment of my invention, the elementary particles of the proton type would impinge directly on the phosphor producing the ultra-violet light directly without reacting with the boron.

In accordance with the broader aspects of my invention, the apparatus comprising my invention can be employed in the detection of quanta of radiation. This is achieved by employing a light-sensitive material which emits charged particles on being bombarded with quanta of radiation of a desired frequency. By "quanta of radiation of a desired frequency," I mean radiation of which detection is desired.

I have described my invention as employing two separate layers for absorption of incident radiation and emission of ultra-violet light. In accordance with the broader aspects of my invention, this is not mandatory. The two layers can be replaced by a single layer comprising a phosphor sensitive to the radiation involved and having a high yield of ultra-violet when bombarded by the radiation of which detection is desired.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In combination, an electric discharge device having an envelope of ultra-violet transmitting material, a boron-impregnated phosphor coating on the outer surface of said envelope, a transparent conducting coating on the inner surface of said envelope, a center conductor in the interior of said tube, and a gas which is readily ionized by the ultra-violet light produced by said boron-impregnated phosphor coating between said center conductor and said transparent conducting coating and facilities for impressing a potential between said center conductor and said transparent conducting coating so that electrons are attracted toward said center conductor.

2. In combination, an envelope constructed of material capable of transmitting radiation, an active coating on the outer surface of said envelope comprising a substance capable of absorbing neutrons and emitting as a result thereof high speed charged particles and a substance capable of absorbing said charged particles and emitting as a result thereof the said radiation, a conducting coating on the inner surface of said tube transparent to said radiation, a center conductor inside said tube, a gas which is readily ionized by said radiation between said center conductor and said conducting coating, facilities for impressing a potential between said conducting coating and said center conductor so that electrons will be attracted to said center conductor.

3. In combination, an envelope constructed of material capable of transmitting radiation, an active coating on the outer surface of said envelope comprising a substance capable of absorbing neutrons and emitting as a result thereof high speed charged particles and a substance capable of absorbing said high speed charged particles and emitting as a result thereof the said radiation, another coating on the outer surface of said active coating transparent to neutrons and opaque to said radiation, a conducting coating on the inner surface of said envelope transparent to said radiation, a center conductor inside said envelope, a gas which is readily ionized by said radiation between said center conductor and said conducting coating, facilities for impressing a potential between said conducting coating and said center conductor so that electrons will be attracted to said center conductor.

4. In combination a quartz envelope, a boron-impregnated phosphor coating on the outer surface of said envelope, a metallic grid which is largely open on the inner surface of said envelope, a center conductor in the interior of said envelope, a gas which is readily ionized by the ultra-violet light produced by said boro-impregnated phosphor coating between said center conductor and said metallic grid, facilities for impressing a potential between said center conductor and said transparent conducting coating so that electrons are attracted toward said center conductor.

5. In combination, an envelope constructed of material capable of transmitting radiation, an active coating on the outer surface of said envelope comprising a substance capable of absorbing neutrons and emitting as a result thereof high speed charged particles and a substance capable of absorbing said high speed charged particles and emitting as a result thereof the said radiation, a moderating material surrounding said active coating capable of slowing said neutrons to a speed at which they are capable of producing optimum effect in said active coating.

6. An electric discharge device comprising an envelope of a material capable of transmitting radiation, a coating on the outer surface of said envelope consisting of a substance capable of absorbing neutrons and emitting as a result thereof high-speed charged particles and a substance capable of absorbing said charged particles and emitting as a result thereof the said radiation, and a conducting material near the inner surface of said envelope substantially transparent to said radiation.

7. In combination, an envelope constructed of material capable of transmitting radiation, an active coating on the outer surface of said envelope comprising a substance capable of absorbing charged particles and emitting as a result thereof high-speed charged particles and a substance capable of absorbing said high-speed charged particles and emitting as a result thereof the said radiation, another coating on the outer surface of said active coating transparent to charged particles and opaque to said radiation, a conducting coating on the inner surface of said envelope transparent to said radiation, a center conductor inside said envelope, a gas which is readily ionized by said radiation between said center conductor and said conducting coating, facilities for impressing a potential between said conducting coating and said center conductor so that electrons will be attracted to said center conductor.

8. In combination, an envelope constructed of material capable of transmitting radiation, an active coating on the outer surface of said envelope comprising a substance capable of absorbing quanta of radiation and emitting as a result thereof high-speed charged particles and a substance capable of absorbing said high-speed charged particles and emitting as a result thereof the said radiation, another coating on the outer surface of said active coating transparent to quanta of radiation and opaque to said radiation, a conducting coating on the inner surface of said envelope transparent to said radiation, a center conductor inside said envelope, a gas which is readily ionized by said radiation between said center conductor and said conducting coating, facilities for impressing a potential between said conducting coating and said center conductor so that electrons will be attracted to said center conductor.

9. In combination, an envelope constructed of material capable of transmitting radiation, an active coating on the outer surface of said envelope comprising a substance capable of absorbing charged particles and emitting as a result thereof high speed charged particles and a substance capable of absorbing said high speed charged particles and emitting as a result thereof the said radiation, a moderating material surrounding said active coating capable of slowing said neutrons to a speed at which they are capable of producing optimum effect in said active coating.

10. In combination, an envelope constructed of material capable of transmitting radiation, an active coating on the outer surface of said envelope comprising a substance capable of absorbing quanta particle and emitting as a result thereof high speed charged particles and a substance capable of absorbing said high speed charged particles and emitting as a result thereof the said radiation, a moderating material surrounding said active coating capable of slowing said neutrons to a speed at which they are capable of producing optimum effect in said active coating.

11. An electric discharge device comprising an envelope of a material capable of transmitting radiation, a coating on the outer surface of said envelope consisting of a substance capable of absorbing charged particles and emitting as a result thereof high-speed charged particles and a substance capable of absorbing said charged particles and emitting as a result thereof the said radiation, a conducting material near the inner surface of said envelope transparent to said radiation, and a gas in the interior of the envelope capable of being ionized when acted on by said radiation.

12. In combination, an envelope constructed of material capable of transmitting radiation, an active coating on the outer surface of said envelope comprising a substance capable of absorbing particles of the neutron type and emitting as a result thereof the said radiation, a moderating material surrounding said active coating capable of slowing said neutrons to a speed at which they are capable of producing optimum effect in said active coating.

FITZ-HUGH B. MARSHALL.

REFERENCES CITED

The following references are of record in the file of this patent:

UNITED STATES PATENTS

| Number | Name | Date |
|---|---|---|
| 2,030,440 | Fritz et al. | Feb. 11, 1936 |
| 2,398,934 | Hare | Apr. 23, 1946 |
| 2,458,099 | Roop | Jan. 4, 1949 |